May 8, 1928. 1,668,861
H. H. MERCER
DRILLING MECHANISM
Filed Oct. 8, 1924 8 Sheets-Sheet 2
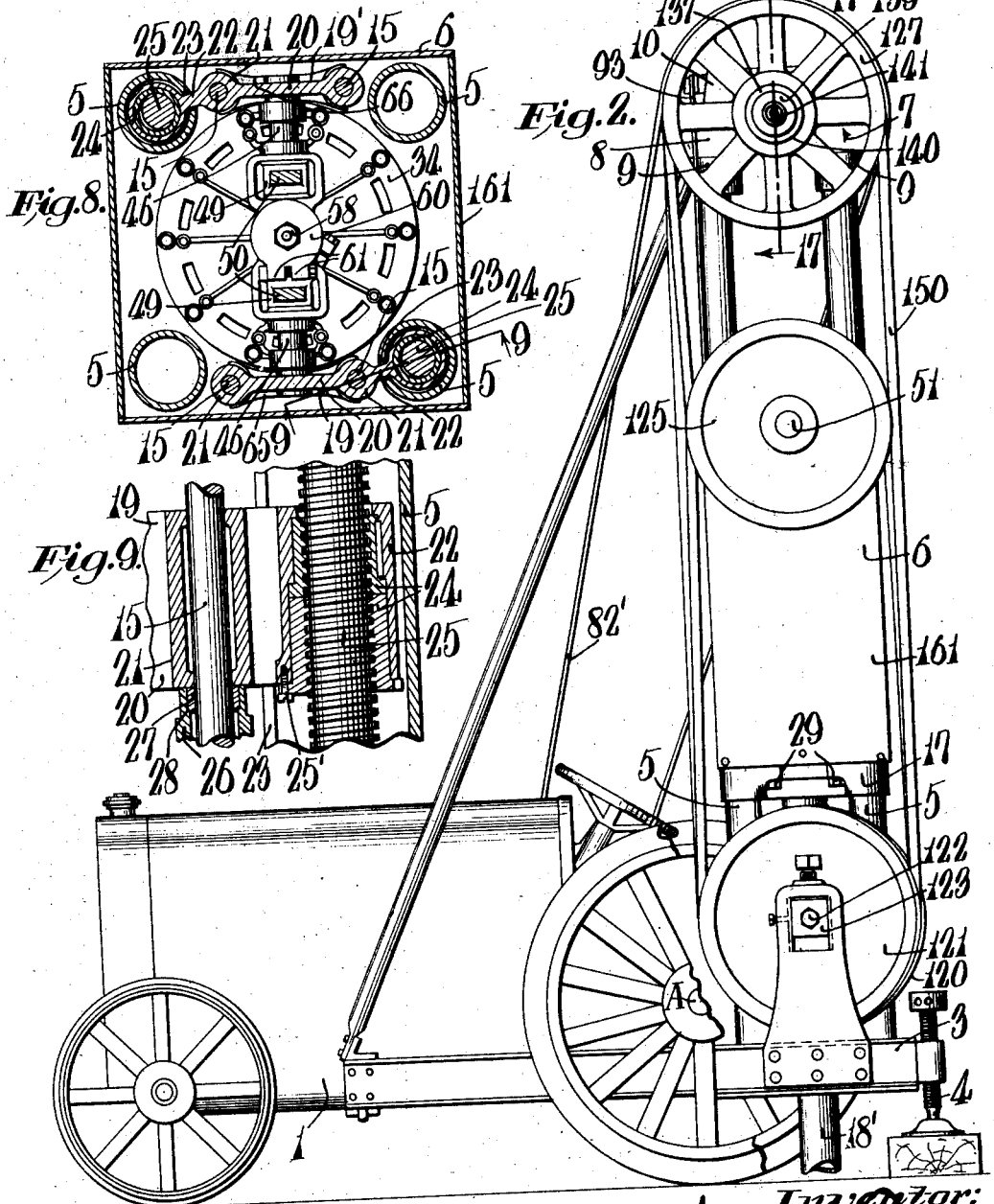
Inventor:
Henry H. Mercer.
by
Horace ———
atty.

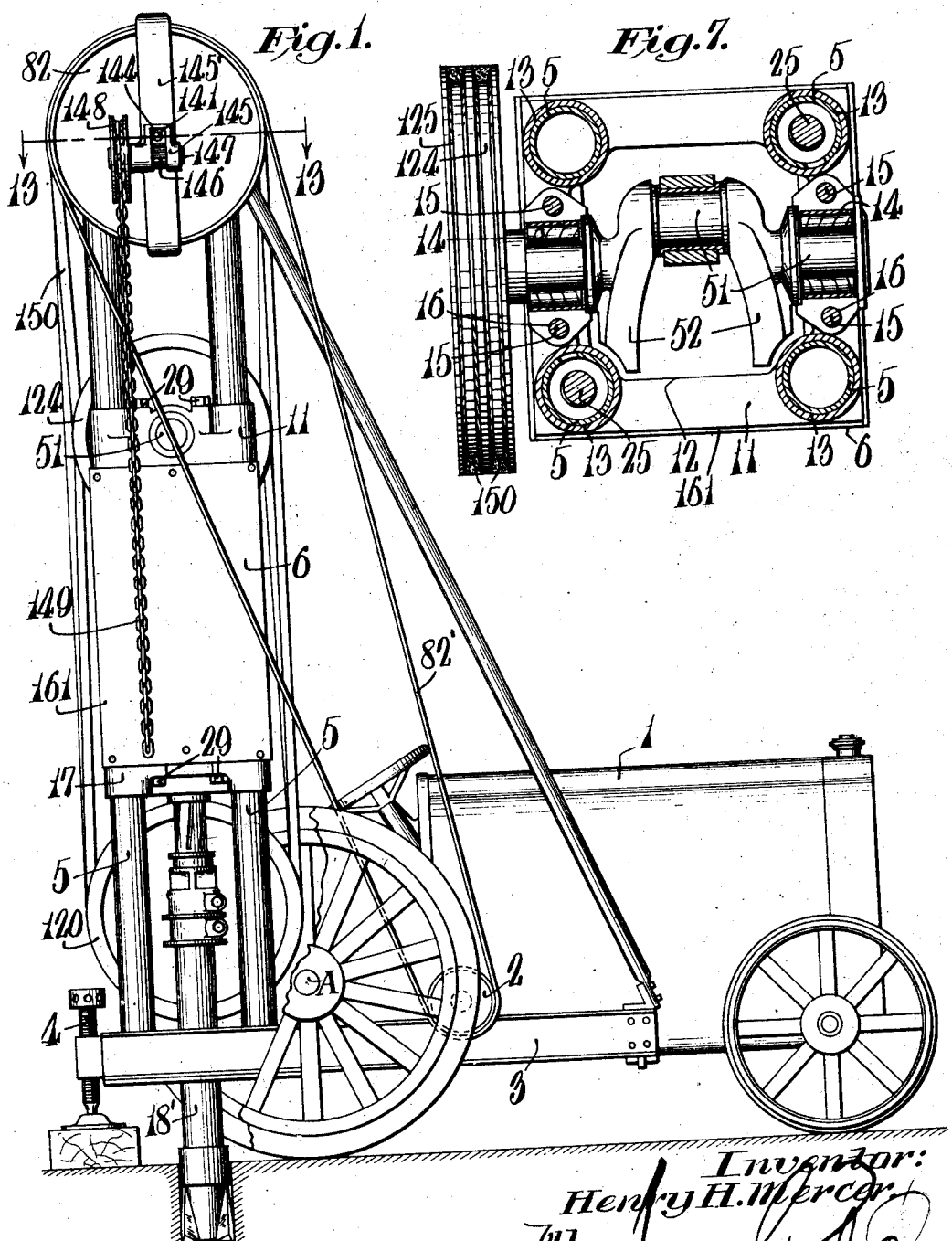

May 8, 1928.  
H. H. MERCER  
1,668,861  
DRILLING MECHANISM  
Filed Oct. 8, 1924  
8 Sheets-Sheet 3
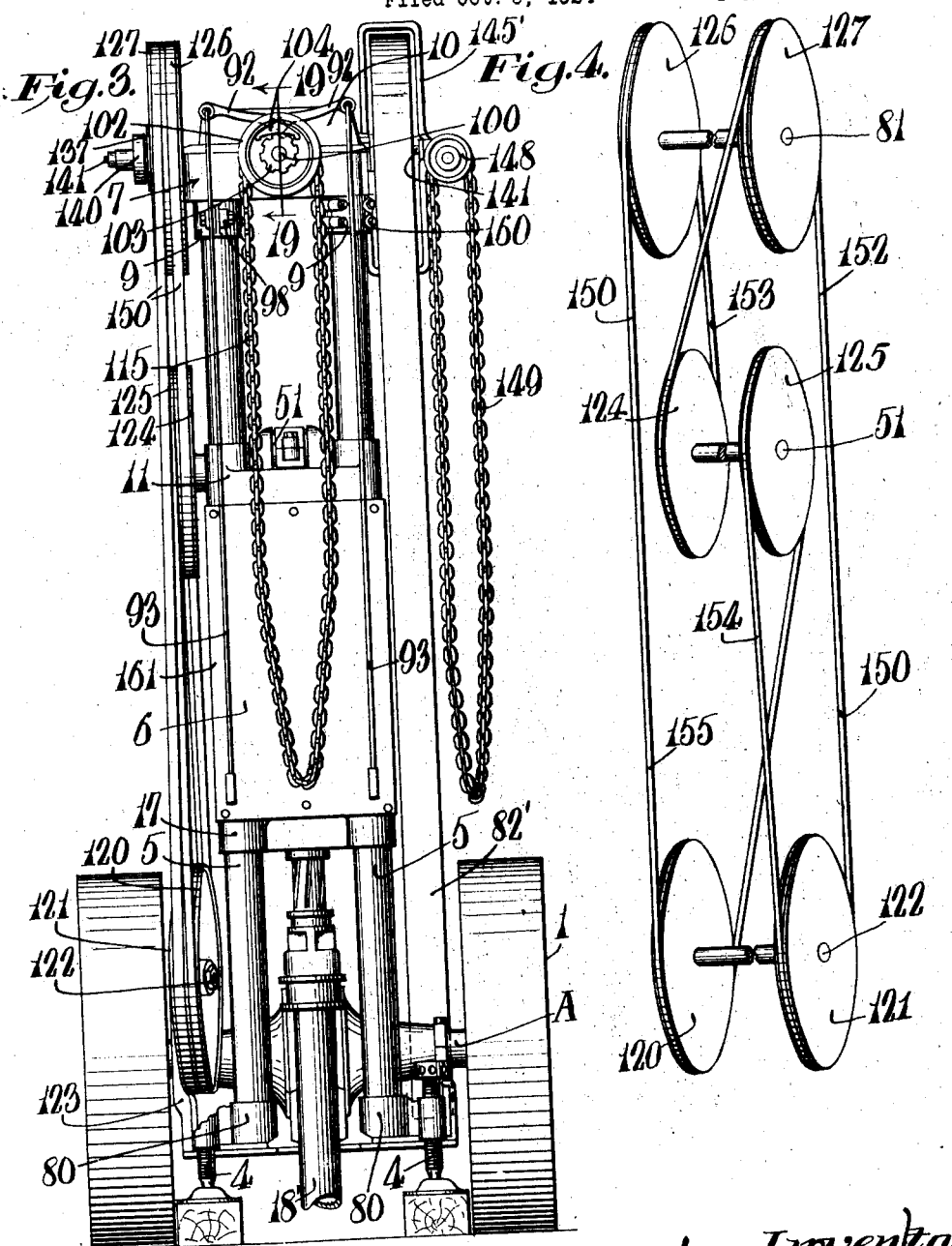
Inventor:  
Henry H. Mercer.  
by  
atty.

May 8, 1928.
H. H. MERCER
1,668,861
DRILLING MECHANISM
Filed Oct. 8, 1924
8 Sheets-Sheet 4
Fig.5.
Fig.6.
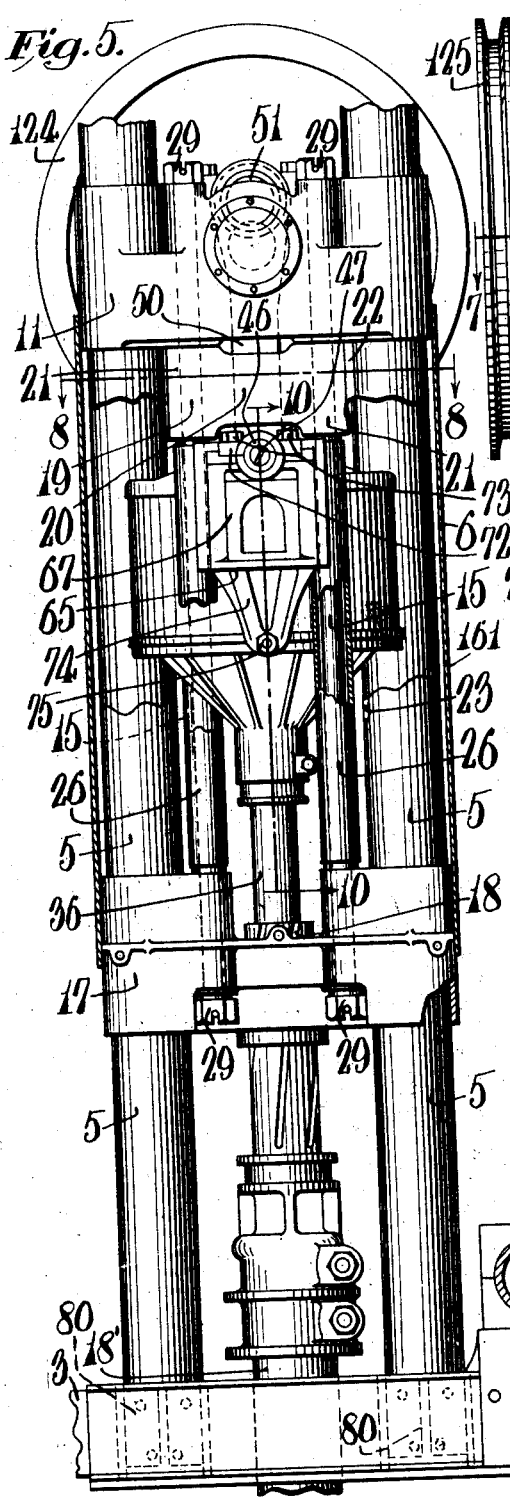
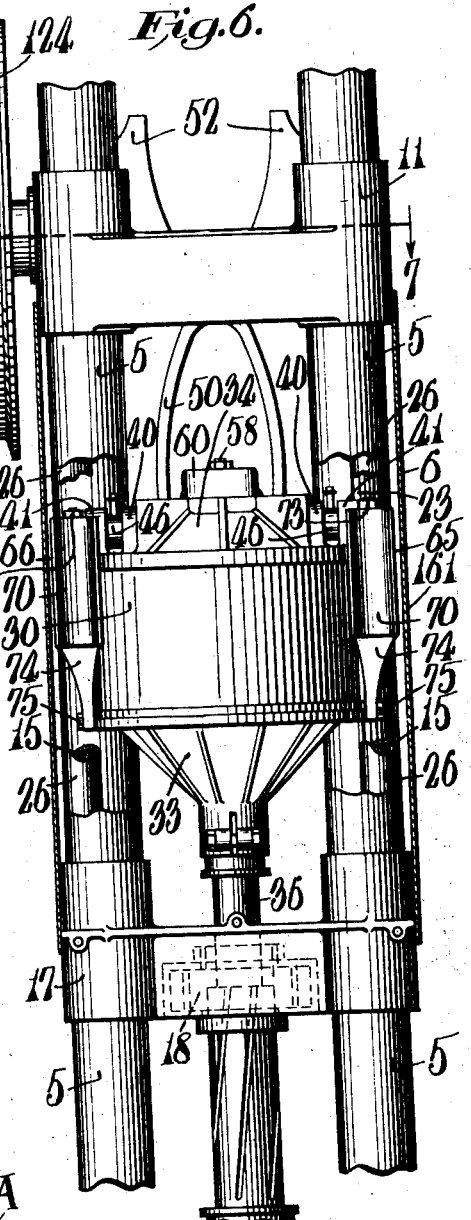
Inventor:
Henry H. Mercer.
by
atty.

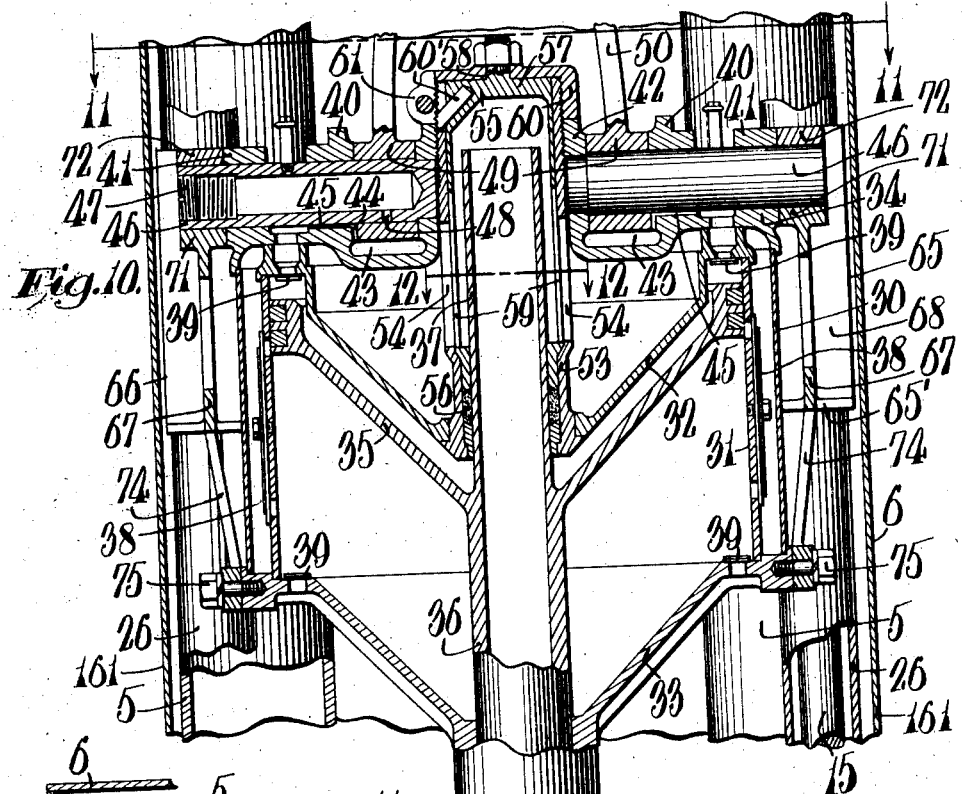
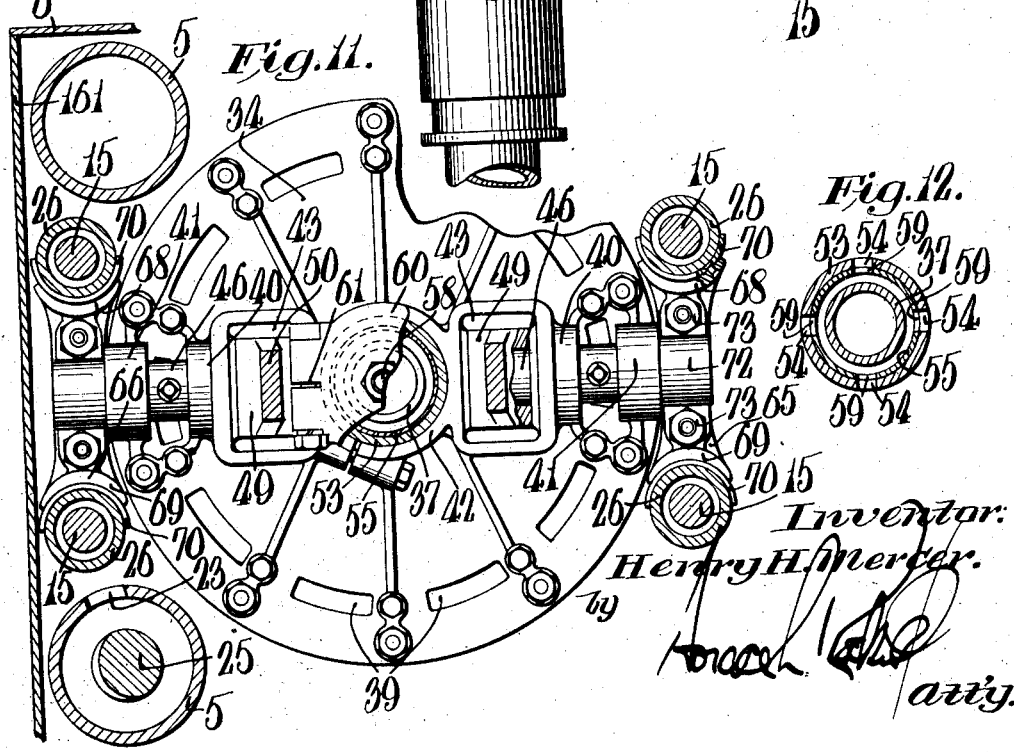

May 8, 1928.
H. H. MERCER
1,668,861
DRILLING MECHANISM
Filed Oct. 8, 1924
8 Sheets-Sheet 6
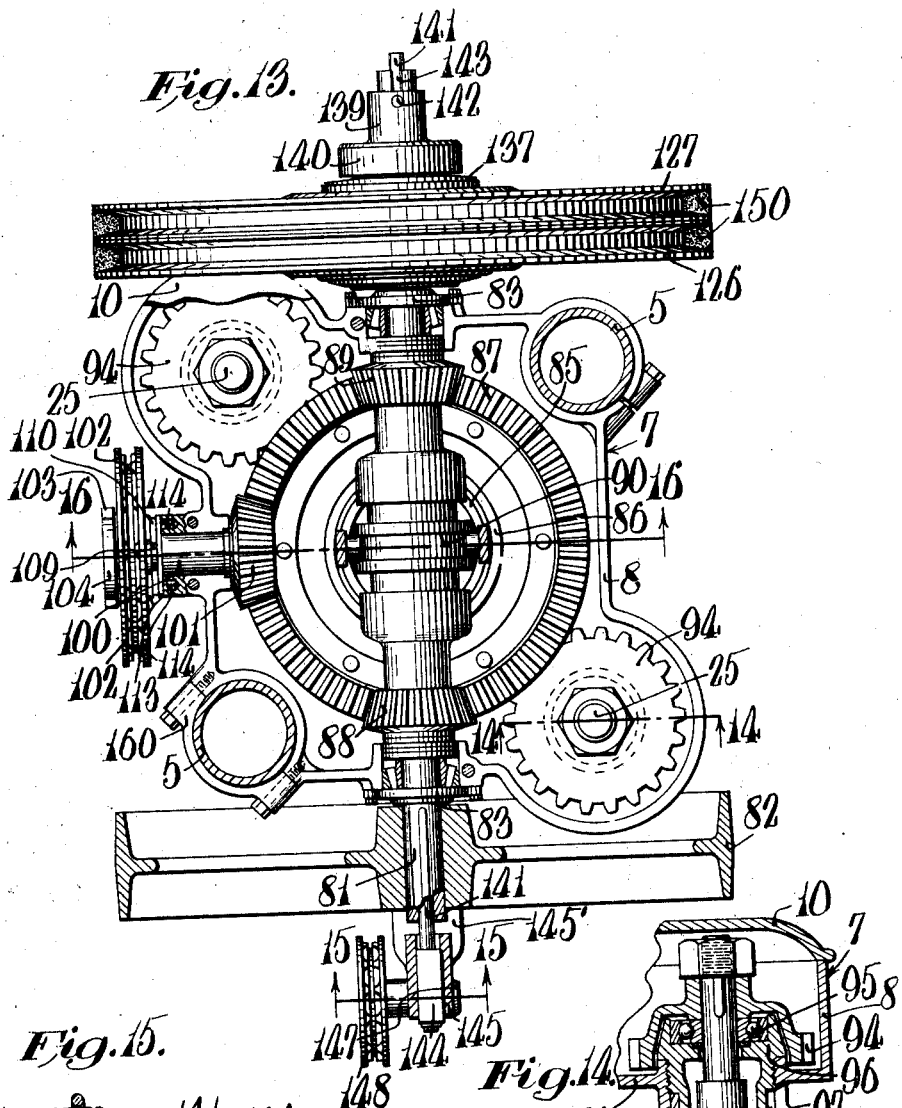
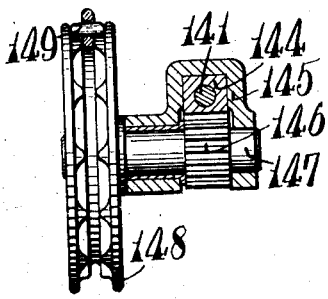
Inventor:
Henry H. Mercer.
by
atty.

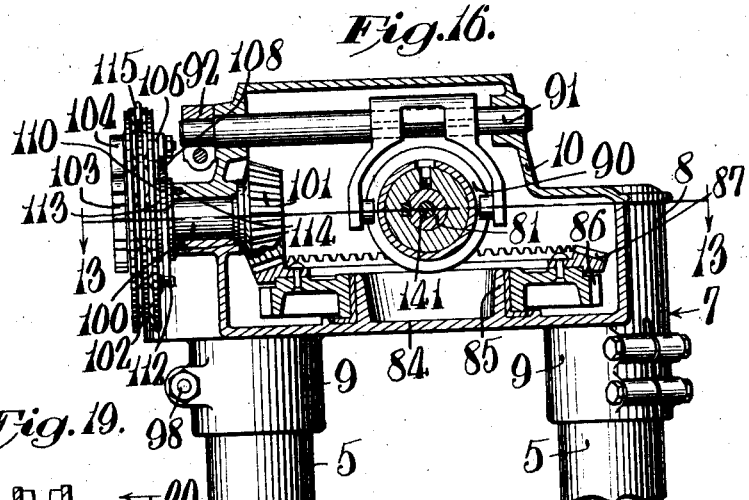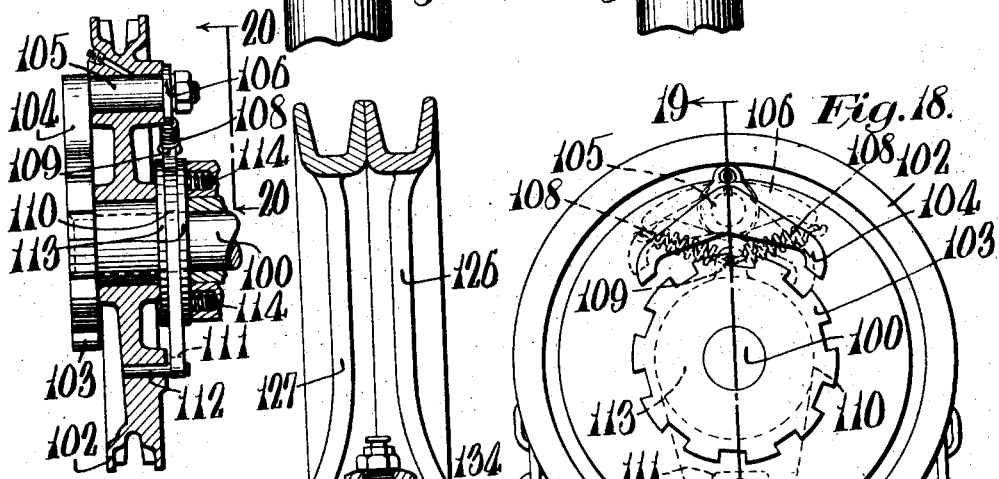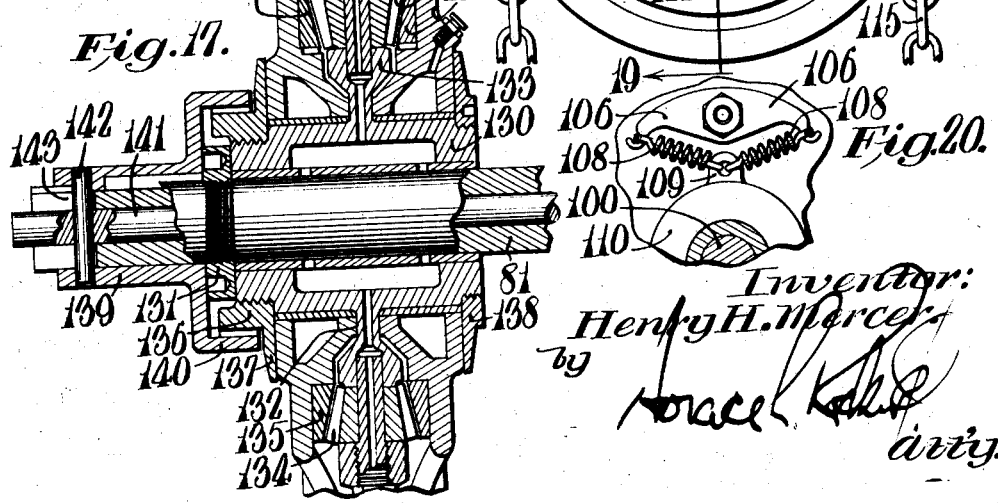

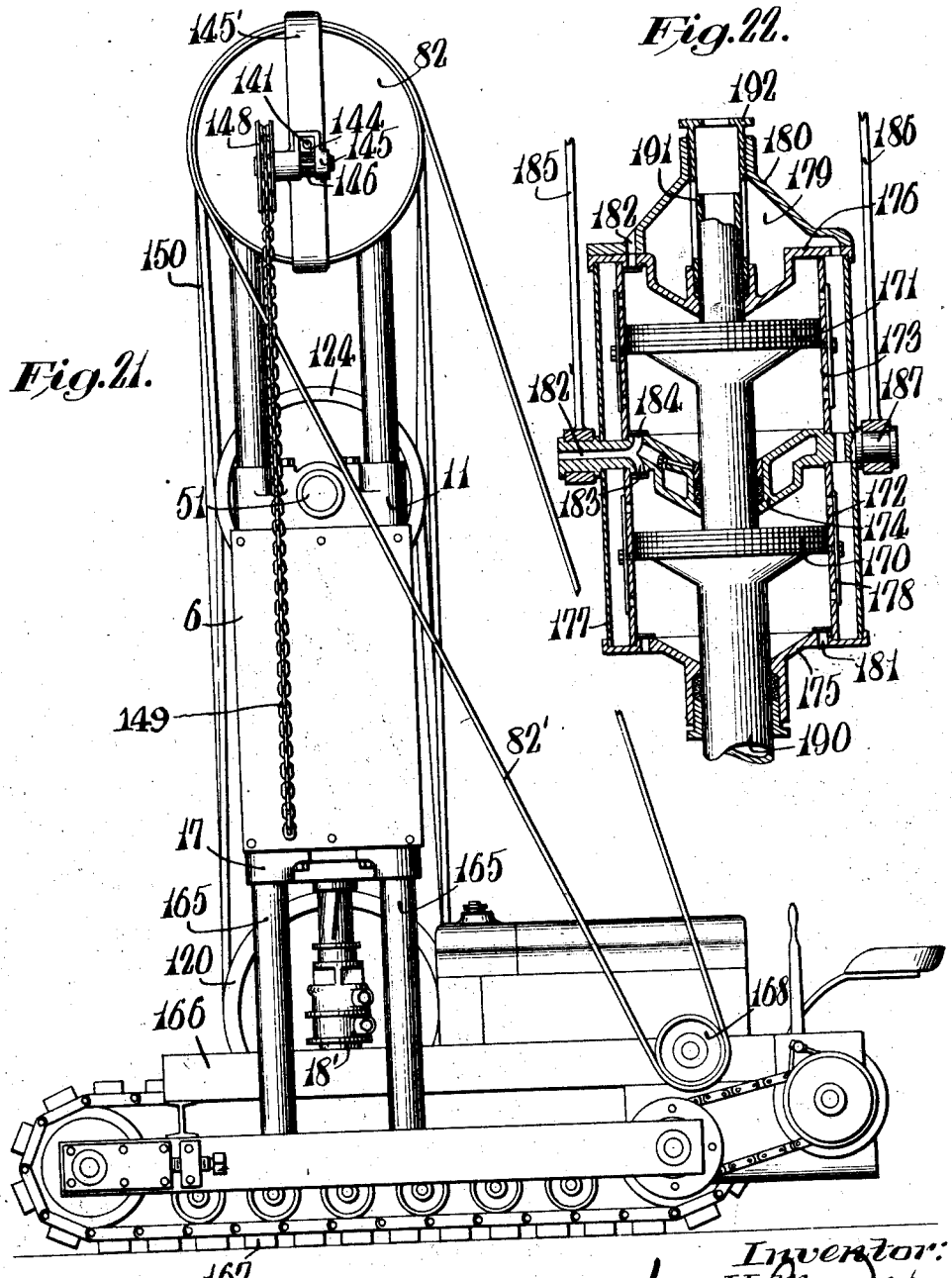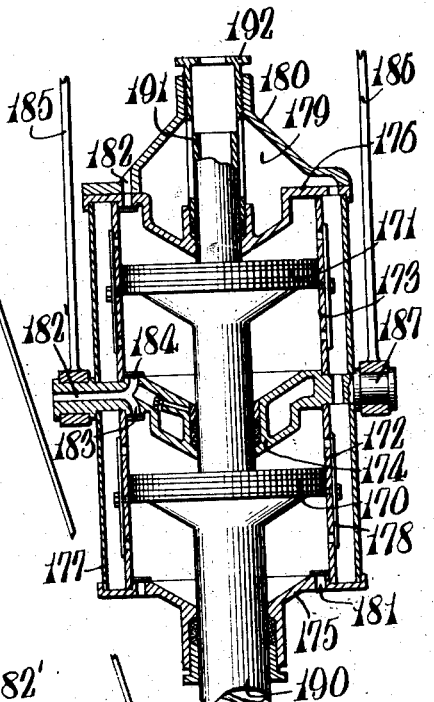

Patented May 8, 1928.

1,668,861

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

DRILLING MECHANISM.

Application filed October 8, 1924. Serial No. 742,337.

This invention relates to drilling mechanisms.

It has for its object to provide an improved drilling mechanism. A further object is to provide an improved portable drilling mechanism especially adapted for drilling holes of large diameter in friable or tough material. Another object is to provide an improved upright standard adapted to be mounted upon a tractor or motor driven base which may if desired have the usual type of caterpillar treads. Another object is to provide an improved means for supporting and reciprocating a hollow steel and improved means for adjusting the elevation or operating position of these. A further object is to provide improved means for actuating the steel reciprocating means during raising or lowering thereof, which means comprises generally a flexible driving member adapted to cooperate with a plurality of radially alined pulleys, certain of which are mounted upon fixed axes carried by the standard, while intermediate pulleys are adapted to travel up and down during raising and lowering of the drill steel. Another object is to provide improved supporting means for my improved combined hole cleansing fluid generating means and steel reciprocating means disclosed in my copending application Serial No. 472,546, filed May 25, 1921. Another object is to provide improved manual or power control means for raising and lowering the steel. These and other objects and advantages of my improved construction will, however, hereinafter more fully appear.

In the accompanying drawings I have shown for purposes of illustration several forms which my invention may assume in practice.

In these drawings,—

Fig. 1 is a side elevation of my improved drilling mechanism.

Fig. 2 is a side elevation looking from the opposite side to that in Fig. 1.

Fig. 3 is an end elevation of the whole mechanism.

Fig. 4 is a diagrammatic perspective view of the improved belt driving means for actuating the steel reciprocating mechanism.

Fig. 5 is an enlarged side elevation of the frame and standards, parts of which are broken away to show details of construction.

Fig. 6 is a front elevation of the view shown in Fig. 5, looked at from the left hand side, parts of which are also broken away to show details of construction.

Fig. 7 is a sectional plan view on line 7—7 of Fig. 6.

Fig. 8 is a sectional plan view on line 8—8 of Fig. 5.

Fig. 9 is an enlarged fragmentary vertical section on line 9—9 of Fig. 8.

Fig. 10 is an enlarged vertical section of the steel actuating cylinder and piston taken on line 10—10 of Fig. 5.

Fig. 11 is an enlarged sectional plan view on line 11—11 of Fig. 10.

Fig. 12 is an enlarged transverse section on line 12—12 of Fig. 10.

Fig. 13 is an enlarged sectional plan view on lines 13—13 of Figs. 1 and 16.

Fig. 14 is an enlarged vertical section on line 14—14 of Fig. 13.

Fig. 15 is an enlarged vertical section on line 15—15 of Fig. 13.

Fig. 16 is a vertical sectional view taken on line 16—16 of Fig. 13.

Fig. 17 is an enlarged vertical sectional view of the differential mechanism between two of the pulleys in my improved means for driving the steel reciprocating mechanism and is taken on line 17—17 of Fig. 2.

Fig. 18 is an enlarged elevation of the improved means for manually feeding the steel upwardly or downwardly and is shown in its proper relation to the whole mechanism in Fig. 3 as disposed at the upper end of the vertical standards.

Fig. 19 is a vertical section on line 19—19 of Figs. 3 and 18.

Fig. 20 is a fragmentary elevation of the manual control means looked at in the direction of the arrow from line 20—20 of Fig. 19.

Fig. 21 is a side elevation of my improved mechanism mounted upon a modified form of tractor or vehicle.

Fig. 22 is a vertical sectional view of a modified form of an improved steel reciprocating means.

Drilling mechanisms of the type disclosed herein are usually used on very rugged and unlevel land and it is accordingly highly desirable to make as compact a structure as possible in order that no trouble will be experienced in alining the drilling mechanism with a suitable source of power and the hole proposed to be bored. I have shown a tractor 1 of a well known type having the usual driving pulley 2 projecting from the side of the same and actuated by the tractor engine. A supplemental frame for supporting my improved drilling mechanism comprises channel members 3 disposed on each side of the tractor and suitably bolted thereto and hung upon the axle A of said tractor. Carried on the outer end of the frame are suitable jacks 4 the purpose of which is to vertically aline the drill steel 18′ with the hole proposed to be drilled and to also steady the mechanism during the drilling operation. Projecting upwardly from the supplemental frame are four pipes 5 constituting standards on which a frame 6 is slidably mounted. The upper ends of the pipes 5 form the corners of a rectangle and are held together by a head 7 which, as shown in Figs. 3, 13 and 16, comprises a hollow base 8 having downwardly projecting clamping collars 9 to engage the ends of the pipes and a suitable cover 10 adapted to carry a suitable clutch shifting mechanism. The base 8 is adapted to be filled with lubricant whereby the rotating parts carried therein are thoroughly lubricated.

The frame 6 comprises an upper head 11 which, as shown in Fig. 7, is rectangular in shape and has a central opening 12 and bores 13 at each corner of the head which form suitable sliding bearings to cooperate with the four standards 5. Crank shaft bearings 14 are held to the head by bolts 15 passing through spaced apertures 16 and these bolts, as shown in Fig. 5, extend downwardly to engage a lower head 17 which also has bearings adapted to slidingly engage the standards 5 similar to those in the upper head 11. Carried at the central portion of the lower head is suitable rotation mechanism 18 adapted to rotate a hollow drill steel 18′. The drill steel and rotation mechanism is fully disclosed in my above mentioned co-pending application and will not be further described. The upper and lower heads are held in fixed spaced relation by having mounted immediately below the upper head 11 upon each pair of bolts 15 that pass through the bearings 14, nut carrying members 19 and 19′ each of which comprises a vertical web 20 having rod receiving lugs 21 on the opposite ends thereof. Projecting outwardly from one of the lugs 21 of each member are arms 22 extending through slots 23 running substantially throughout the length of two diagonally opposite standards 5, while carried by each of the arms is a plural-part nut 24 adapted to engage a screw 25 extending substantially throughout the length of two diagonal standards and rotated by suitable mechanism disposed within the head 7, later described. As shown in Fig. 9 the nut comprises a fixed upper portion disposed within a suitable recess formed in the arm 22 and a separate lower portion adapted to be rotatably adjusted as by having suitable slots formed on the periphery of a flange on the lower end thereof which engages a removable stud 25′. In order to take up wear and thus prevent considerable backlash the stud 25′ will be removed and the lower portion of the nut rotated, which will cause relative longitudinal movement between the upper and lower portions thereof, after which the stud 25′ will be again placed in position through any one of the notches in the periphery of the flange which might register with the opening which receives said stud. Also mounted upon the rods 15 and between the nut carrying members 19 and 19′ and the lower head 17 are combined spacing rods and bearing members 26, these members centered with respect to the rods 15 by collars 27 disposed at each end thereof. These spacing rods have an enlarged recess 28 into which the collars 27 are disposed. By tightening nuts 29 on each of the rods 15 the upper and lower heads and nut carrying members 19 and 19′ and the bearings 14 will be held in fixed relation so that the same will move as a unit upon the four standards 5.

In order to actuate the drill steel 18′ and to supply cleansing fluid thereto I employ a modified form of my improved combined steel reciprocating and pumping means as disclosed in my above mentioned application. This means comprises concentric cylinders 30 and 31 clearly shown in Fig. 10, upper and lower heads 32 and 33 and a second upper head 34. The cylinder structure is positively reciprocated relative to the frame 6 and suitably slidably supported by mechanism hereinafter described. A piston 35 has a rod 36 extending downwardly to which is secured the hollow drill steel 18′ and upon reciprocation thereof said piston will rotate with the steel due to the rotation mechanism 18. Extending upwardly from the piston 35 is a fluid conducting tube 37 adapted to receive pressure fluid from a chamber formed between the heads 33 and 34 to which fluid is supplied from the cylinder 31 through the space between the concentric cylinders 30 and 31. Suitable valve mechanism 38 is provided for allowing pressure to build up within said chamber while flow of fluid to the opposite ends of the cylinder is through suitable valve mechanism 39. The second upper head 34 has the following improved construction over the head shown in my co-pending application in that it comprises spaced supports 40 and 41 disposed on each side of a central boss 42. A recessed portion 43 forms a secondary oil reservoir adapted to have communication with the cylinder 31 as by vertical and longitudinal passages 44 and 45, the latter terminating in the space between each of the supports 40 and 41 through which air to the upper valves 39 flows. Disposed within the supports 40 and 41 and the boss 42 are hollow wrist pins 46 adapted to serve as oil reservoirs to which a lubricant may be supplied as through a plug 47. A small lubricant port 48 is disposed adjacent bearings 49 of a connecting rod 50 which is carried by a crank shaft 51 mounted in the bearings 14. After the lubricant has passed through the bearings 49, it accumulates in the chamber 43 and due to the flow of air between the supports 40 and 41 to the valves 39 a suction will be created within the passage 45 to draw lubricant into the cylinder 31.

The connecting rod 50 is shown as comprising a single member substantially V shape so as to provide two bearings 49 at the spaced end of the V and to provide at the apex of the V a single bearing to engage the crank shaft. Suitable counter-weights 52 are carried by the crank shaft and are so spaced and shaped as to allow the same to properly clear the connecting rod 50.

In the operation of the device thus far described, the rotation of the crank shaft will positively reciprocate the cylinder and cause pressure fluid to be pumped within the chamber between the heads 33 and 34, flow of fluid therefrom to the member 37 being controlled by an improved means over that disclosed in my above mentioned copending application in that it comprises a hollow member 53 having a suitable shoulder adapted to engage the head 32 and projecting upwardly to have threaded engagement with the central boss 42, vertical slots 54 being cut through the sides of said member. A hollow member 55 telescopes within the member 53 and engages packing 56 at its lower end while its upper end is closed as at 57 from which a stud 58 projects. Vertical slots 59 formed through the sides of the member 55 are adapted to register with the slots 54, and to vary the degree of registering and to lock the same in any desired position I provide a cap 60 having threaded engagement with the upper end of the member 53, the member 55 and cap being held in fixed longitudinal relation as by a nut threaded upon the stud 58, while relative rotation between members 53 and 55 is prevented by a key 60' carried by member 55 and extending within any one of a series of slots formed in the upper end of the member 53. In order to keep the packing 56 firmly compressed, the cap 60 is provided with a split portion 61 forming a clamp. Thus, in operation, to adjust the packing the clamp 61 will be loosened and the cap 60 rotated. Due to the key 60' the member 55 cannot rotate relative to the member 53, hence member 55 will only have vertical movement. The member 37 extends upwardly through the packing 56 and fluid flows thereto, during relative reciprocation of the piston and cylinder, through the openings 54 and 59.

Aside from my present improved head and fluid control arrangement, I have provided improved means for slidably supporting the cylinder 30 during positive reciprocation thereof and herein shown as comprising bearing supporting members 65 and 66 disposed at diametrically opposite points of the cylinder structure and each comprising a rectangular shaped frame 67 carrying cylindrically recessed bearing receiving portions 68 and 69 on the vertical sides thereof. The frame 65 is disposed between the rods which pass through one of the bearings 14, while the frame 66 is disposed between the rods which pass through the other bearing 14 as clearly shown in Fig. 11. Bearing bushings 70 are adapted to be held within the cylindrical recesses formed in the supports 68 and 69 so as to slidingly engage the spacing rods 26 as clearly shown in Fig. 11. The bearings 70 are of substantial length and as clearly shown in Fig. 10 terminate at the lower end 65' of the frame 65. The upper end of the frames 67 each have a bearing 71, to engage the outer end of the studs 46, comprising a removable cap 72 held to the frame as by bolts 73. The lower end of the frames 67 have depending arms 74 fixed to the lower cylinder head 33 as by studs 75. Thus the cylinder 30 will have a definite slidable relation with respect to the frame 6 due to the fixed relation of the rods 15 to the upper and lower heads 11 and 17. Inasmuch as the cylinder 30 is entirely slidably supported by the spacing rods 26 the latter, if having only one operating position, would become excessively worn and to overcome this it is possible, due to the centering bushings 27, to rotate the spacing rods 26 as by loosening the nuts 29 to present a new bearing surface to the bushings 70.

The mechanism for actuating the screws 25, which are journaled at their lower ends in suitable bearings 80, in order to raise and lower the frame 6 comprises a shaft 81 having a pulley 82 fixed thereto and in radial alinement with driving pulley 2, a belt 82' connecting said pulleys. The shaft 81 as shown in Fig. 13 is journaled in bearings 83 formed in the side walls of the base 8. Projecting upwardly from the bottom 84 of the base is a cylindrical bearing boss 85 adapted to rotatably support a spur gear 86 which also carries a bevel gear 87. Bevel pinions 88 and 89 mounted upon the shaft 81 and controlled by suitable reversing clutch mechanism 90 mesh with the bevel gear 87. Manual means for shifting the clutch 90 comprises a shaft 91 journaled in bearings carried by the cover 10. Oppositely extending levers 92 are mounted upon the outer end of the shaft 91 to which pull ropes 93 are attached. Thus by pulling one rope or the other, one or the other clutch elements of the plural-clutch 90 will be thrown into engagement to cause rotation of one or the other of the bevel pinions 88 and 89 to cause forward or reverse rotation of the bevel gear 87. In order to drive the screws 25 in one or the other direction as is desired to raise or lower the frame 6, pinions 94 fixed upon the upper ends of the screws mesh with the spur gear 86. The screws are suitably journaled at their upper ends in bearings 95 carried by a housing 96 which has telescopic engagement with the bore of the standard 5, the latter being split at its upper end as at 97. The bosses 9 which project downwardly from the base 8 and engage the standards 5 are split to form a clamp 98 so that when the same are tightly clamped the bearing support 96 will also be firmly clamped. A nut 99 has threaded engagement with the screw 25 and slidably engages the lower surface of the bearing bracket 96 to thereby take the upward thrust of the screw.

Manually operable means provided for raising and lowering the frame 6, comprises a shaft 100 rotatably mounted within a bearing carried by one of the other sides of the base 8 and to which a bevel pinion 101 is fixed so as to mesh with the bevel gear 87. A chain sprocket 102 as shown in Fig. 19 is rotatably journaled upon the outer end of the shaft, while a square toothed ratchet 103 is fixed to the shaft. A two-fingered pawl 104 is fixed upon the outer end of a shaft 105 pivotally mounted within a suitable bearing carried by the chain sprocket 102 and which carries fixedly on its inner end oppositely extending fingers 106 to which one end of springs 108 are connected while the other ends thereof are connected to a common lug 109 carried by a plate 110 surrounding the shaft 100 and having an elongated recessed portion 111 adapted to engage a pin 112 carried by the sprocket 102. Friction plates 113 are disposed on opposite sides of the plate 110 and to increase friction therebetween springs 114 are carried in a stationary support and tend to press the plates 110 and 113 together. A chain 115 passes around the sprocket 102 down to within easy reach of the operator.

When the manual feeding means is inoperative, the pawl 104 is disengaged from the ratchet 103 due to the springs 108. Rotation of the shaft 100 due to the rotation of the gear 87 and pinion 101 will not impart any positive movement to the chain sprocket 102 as the plates 110 and 113 and the sprocket 102 only have rotatable bearing supporting connection with said shaft. When the operator pulls upon one side of the chain 115 friction will tend to hold the plate 110 and due to the elongated slot 111 the pin 112 will not engage the plate 110 until after sufficient relative movement has taken place between the chain sprocket 102 and the plate 110. By the time the pin 112 engages the plate 110 the center of the shaft 105 will have been displaced a sufficient distance to one side of the lug 109, so that one or the other of the springs 108, depending upon which side of the chain 115 is pulled, will have a greater tension than the other, resulting in actuation of one of the pawl fingers 104 so as to engage the teeth of the ratchet 103. Continued pull on the chain will obviously cause positive rotation of the pawl and consequently shaft 100, bevel pinion 101 and bevel gear 87 to cause rotation of the screws 25 to feed the frame 6.

The mechanism for driving the crank shaft 51 as it raises and lowers with the frame 6 comprises a pair of rotatable coaxial pulleys 120 and 121 mounted upon a suitable shaft 122 carried in an adjustable hanger 123 supported on the channel member 3 of the supplemental frame attached to the tractor. A second set of rotatable and coaxial pulleys 124 and 125 are adapted to be carried by the frame 6 and to move therewith, one of said pulleys being fixed to the crank shaft 51. A third set of relatively rotatable and coaxial pulleys 126 and 127 are carried by the shaft 81. It is to be understood that the several sets of pulleys are in radial alinement and that the slight displacement of the intermediate set of pulleys shown in Fig. 4 is merely to render the drawing clear. As shown in Fig. 17, the pulleys 126 and 127 carried by the casing 8 are connected through gear differential mechanism to the shaft 81. This mechanism comprises a hub 130 rotatably journaled upon the shaft 81 and held against longitudinal movement by a nut 131 having a threaded engagement therewith. A radial flange 132 extends around the periphery of the member 130 and carries a plurality of circumferentially spaced gear supporting bosses 133 and through any usual construction are adapted to rotatably support differential gear pinions 134 meshing with opposed differential bevel gears 135 keyed to the hub portion of the pulleys 126 and 127 which are rotatably mounted upon the periphery of the hub 130. Threadedly connected to the outer end of the hub 130 is a gear clutch element 136 having a flange 137 laterally engaging the hub of the pulley 127, while a flange 138 has threaded engagement with the other end of the hub 130 to laterally support the hub of pulley 126. Slidably mounted upon and keyed to the shaft 81 is a sleeve 139 carrying a clutch element 140 adapted to cooperate with the other element 136. This clutch comprises usual internal and external gear teeth. In order to shift the clutch into and out of engagement, a shaft 141 is longitudinally slidably within a suitable bore in the shaft 81. A transverse pin 142 slidable within a transverse slot 143 formed in the shaft 81 connects the shaft 141 and sleeve 139. As shown in Fig. 13, the clutch shifting shaft 141 extends entirely through the shaft 81 and carries at its other end a rack 144 slidably mounted within a suitable support 145 carried by an arm 145' extending outwardly from the base 8. A pinion 146 fixed to a shaft 147 rotatably mounted within said support 145 is adapted to be actuated by a suitable sprocket and chain 148 and 149 respectively, the latter as shown in Fig. 1 extending downwardly to within easy reach of the operator. When it is desired to operate the clutch, pull upon the chain 149 in either direction will cause shifting of the shaft 141 and consequently engagement or disengagement of the gear clutch 136 and 140.

The operation of the pulley and belt connections consists in driving the shaft 81 by the pulley and belt connection with the tractor engine. Assuming that the gear clutch 140 is in engagement, the hub 130 will be positively driven, it being understood that the pitch of the threads of all the threadedly engaged members is such that they will be screwed tighter during any operation. Assuming that the frame 6 is held in a fixed position, the bevel pinion 134 will drive both pulleys 126 and 127 in the same direction and at the same rate of rotation. Obviously the endless belt 150 which successively passes around the several pulleys will impart movement to both of the pulleys 124 and 125 to cause actuation of the crank shaft 51. Should the frame be moved downwardly, the portions 152 and 153 of the belt will cause the pulleys 126 and 127 to be turned in opposite directions as obviously these portions are taken off of the respective pulleys from opposite sides. The belt during such movement is maintained at its initial tautness inasmuch as the portions 154 and 155 will move down over the pulleys 121 and 120 and up to the pulleys 127 and 126. When the frame 6 is raised, the pulleys 126 and 127 will be rotated in the reverse direction to that just previously mentioned. During either raising or lowering of the frame 6 it is obvious that continuous rotation of the shaft 81 will continuously impart rotation to the shaft 51 and thus not interfere in the least with reciprocation of the drill through the cylinder and piston arrangement 31 and 35.

In order to facilitate the removal of the piston and cylinder construction for actuating the drill steel or the elements associated therewith, I have provided means for laterally removing one of the standards 5 herein shown as comprising a removable cap 160 which connects the upper end of the standard desired to be removed to the base 8 to the base 7. This arrangement permits the cylinder or its associated elements to be removed diagonally from between the remaining standards. In order to prevent dust gaining access to the working parts carried by frame 6, sheet metal sides 161 may be provided for the frame, which construction could also be used for housing the several sets of pulleys for driving the crank shaft 51.

In the modified form of my construction shown in Fig. 21 I have shown substantially the same arrangement of drilling elements including standards 165 except that it is mounted upon a tractor 166 intermediate its ends. This tractor also has caterpillar treads 167. The usual auxiliary driving pulley 168 is also used to drive the pulley 82. One of the advantages to be derived from this arrangement is less liability to tipping and it is easier to aline the steel with the hole and maintain it so.

In Fig. 22 I have shown a slightly modified form of combined cleansing fluid pump and steel reciprocating mechanism comprising pistons 170 and 171 reciprocatable within cylinders 172 and 173 separated by a common cylinder head 174, while cylinder heads 175 and 176 are provided for the other ends of the cylinders. An outer cylinder 177 is adapted to form a passageway for the fluid pumped from the respective cylinders through port and valve mechanism 178, similar to that shown in the preferred form, to a storage chamber 179 formed between the upper head 176 and a second head 180. Suitable inlet ports 181 and 182 are provided for the remote ends of the upper and lower cylinders, while a common port 182' is adapted to allow flow of fluid to valves 183 and 184 of the adjacent ends of the cylinders. Connecting rods 185 and 186 are pivotally supported upon stub shafts 187 carried by the common head 174. Cleansing fluid flows to the drill steel through a hollow piston rod 190 as through an upwardly axially extending hollow portion 191 telescopically engaging a suitable adjusting sleeve 192 similar in construction to that shown in the preferred form.

While I have in this application specifically described several forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A drilling mechanism comprising a wheeled support having a power driven element thereon and a vertical standard carried by said support, a frame slidably supported thereby, a tool and actuating means therefor driven by said power driven element and carried by said frame, and means for feeding said tool including a rotatable shaft disposed longitudinally of said standard.

2. A drilling mechanism comprising a portable base having a power driving element thereon, a guiding frame on said base including several hollow standards, a frame slidably supported thereby, a tool associated with said frame, and means for feeding said tool relative to said guiding frame operatively connected to said power driving element including means disposed within two of said standards.

3. A drilling mechanism comprising a support having a power driving element thereon, a hollow standard mounted on said support, a movable drill carrying frame guided thereon, and means for feeding said frame longitudinally relative to said standard including means disposed within the latter and operatively connected at the upper end thereof to said driving element.

4. A drilling mechanism comprising a portable self-propelled support having a power driving element thereon, a plurality of standards mounted on said support, a movable drill carrying frame guided between said standards, a second set of hollow standards mounted on said support, and means for feeding said frame longitudinally relative to said standards including means disposed within said second set of standards and including means operatively connecting the upper end thereof to said driving element.

5. A drilling mechanism comprising a portable self-propelled support having a power driving element thereon, a hollow standard mounted on said support, a movable drill carrying frame guided thereon, and means for feeding said frame longitudinally relative to said standard including cooperating coaxially arranged members disposed within said hollow standard and including means operatively connecting the upper end thereof to said driving element.

6. A drilling mechanism comprising a wheeled support having a power driving element thereon, a vertical standard carried by said support, a slidable frame guided on said standard, drill bit actuating mechanism carried by said frame, and means for feeding said drill bit actuating mechanism relative to said standard including a rotatable shaft disposed longitudinally of said standard and operatively connected to said driving element.

7. A drilling mechanism comprising a wheeled support having a power driving element thereon, a vertical guiding frame carried by said support, a frame slidably guided in said guiding frame, drill bit actuating mechanism carried by said sliding frame, and feeding means for raising and lowering said sliding frame longitudinally relative to said guiding frame comprising a transmission shaft extending longitudinally of the latter, and including means operatively connecting the upper end of said shaft to said driving element.

8. A drilling mechanism comprising a wheeled support having a power driving element thereon, a vertical guiding frame carried by said support, a frame slidably guided in said guiding frame, drill bit actuating mechanism carried by said sliding frame, and feeding means for raising and lowering said sliding frame longitudinally relative to said guiding frame comprising a feed screw disposed longitudinally of said guiding frame, and a cooperating nut carried by said sliding frame, said feeding means including means operatively connecting the upper end of said feed screw to said driving element.

9. A drilling mechanism comprising a supporting frame having a power driving element thereon, a guiding frame mounted on said supporting frame and comprising a plurality of hollow tubular standards, a frame slidably guided between said standards, drill bit actuating mechanism carried by said sliding frame, and means for feeding said drill bit actuating mechanism relative to said guiding frame including means disposed within certain of said standards and operatively connected to said driving element.

10. A drilling mechanism comprising a portable self-propelled support having a power driving element thereon, a guiding frame mounted on said support and comprising a plurality of pairs of hollow standards, a frame slidably guided between said standards, drill bit actuating mechanism carried by said sliding frame, and means for moving said sliding frame longitudinally relative to said guiding frame to drill a substantially vertical hole including means disposed within one standard of each of said pairs and operatively connected to said driving element.

11. A drilling mechanism comprising a guiding frame, a frame slidably guided thereon and having spaced upper and lower heads and means for holding said heads in spaced relation, drill bit actuating means carried by said sliding frame, and means for feeding said sliding frame relative to said guiding frame including nut carrying means disposed between said heads and supported by said holding means, feed nuts carried by said nut carrying means, and feed screws cooperating with said nuts.

12. A drilling mechanism comprising a guiding frame, a frame slidably guided thereon and having spaced upper and lower heads and means for holding said heads in spaced relation, and means for feeding said sliding frame relative to said guiding frame including a feed nut carrying member held in position in engagement with one of said heads by said holding means, and a feed screw cooperating with said feed nut.

13. A drilling mechanism comprising a guiding frame having a hollow standard, said standard having a longitudinally extending slot therein, a frame slidably guided on said guiding frame comprising spaced upper and lower heads and means for holding said heads in spaced relation, and means for feeding said sliding frame relative to said guiding frame including a rotatable element disposed within said hollow standard, and means carried by said holding means and extending through said slot into said hollow standard and engaging said rotatable element.

14. A drilling mechanism comprising a portable self-propelled support having a power driving element thereon, a guiding frame mounted on said support and having a hollow standard, said standard having a longitudinally extending slot formed therein, a frame slidably guided in said guiding means, drill bit actuating mechanism carried by said sliding frame, and means for feeding said actuating mechanism relative to said guiding frame including rotatable means carried within said hollow standard, means carried by said sliding frame and extending through said slot into said standard and engaging said last mentioned means, and means operatively connecting the upper end of said rotatable means to said driving element.

15. A drilling mechanism comprising a portable base having a driving motor thereon, a guiding frame on said base, a frame slidably guided thereon, drill bit reciprocating mechanism driven by said motor and carried by said sliding frame, and feeding means driven by said motor for raising and lowering said sliding frame relative to said guiding frame including a reversing mechanism carried at the upper end of the latter.

16. A drilling mechanism comprising a portable self-propelled support having a power driving element thereon, a guiding frame mounted on said support, a housing carried on the upper end of said guiding frame, a frame slidably guided in said guiding frame, drill bit actuating mechanism carried by said sliding frame, and means for feeding said sliding frame relative to said guiding frame including means disposed within said housing and operatively connected to said driving element.

17. A drilling mechanism comprising a wheeled support having a power driving element thereon, a standard mounted on said support, drill bit reciprocating mechanism slidably guided on said standard and operatively connected to said power driving element, and feeding means for moving said reciprocating mechanism relative to said standard including means rotatable in a horizontal plane and disposed at the upper end of said standard, said latter means being operatively connected to said driving element.

18. A drilling mechanism comprising a wheeled support having a power driving element thereon, a hollow tubular standard mounted on said support, a frame slidably guided on said standard, drill bit reciprocating mechanism carried by the frame and operatively connected to said power driving element, and feeding means for moving said frame relative to said standard including a member disposed within said hollow standard and a cooperating member disposed at the upper end thereof, said feeding means including means operatively connecting said latter member to said driving element.

19. A drilling mechanism comprising a wheeled support having a power driving element thereon, a hollow standard mounted on said support, drill bit reciprocating mechanism slidably guided on said standard and operatively connected to said power driving element, and feeding means for moving said reciprocating mechanism relative to said standard to drill a substantially vertical hole including a member disposed within the standard, and gearing for actuating said member, said feeding means including means operatively connecting said gearing to said driving element.

20. A drilling mechanism comprising a wheeled support having a power driving element thereon, a vertically disposed hollow standard mounted on said support, drill bit reciprocating mechanism slidably guided on said standard and operatively connected to said power driving element, and means for feeding said reciprocating mechanism relative to said hollow standard to drill a substantially vertical hole including a shaft disposed within the standard and having a gear fixed thereto, and a driving gear therefor, the upper end of said shaft being operatively connected to said driving element.

21. A drilling mechanism comprising a wheeled support having a power driving element thereon, a hollow standard mounted on said support, drill bit reciprocating mechanism slidably guided on said standard and operatively connected to said power driving element, supporting means carried by the upper end of said standard, and means for feeding said reciprocating mechanism relative to said standard to drill a substantially vertical hole including a member disposed within the standard and having a gear, and a driving gear therefor rotatably supported by said supporting means, said driving gear being operatively connected to said driving element.

22. A drilling mechanism comprising a wheeled support having a power driving element thereon, a vertically disposed supporting standard mounted on said support, drill bit reciprocating mechanism slidably guided on said standard and operatively connected to said power driving element, and means for feeding said reciprocating mechanism relative to said standard including a plurality of parallel shafts arranged on the upper end of said standard and each having a gear and a driving gear meshing therewith, said driving gear being operatively connected to said driving element.

23. A drilling mechanism comprising a wheeled support having a power driving element thereon, a vertically disposed standard mounted on said support, drill bit reciprocating mechanism slidably guided on said standard and operatively connected to said power driving element, and means for feeding said reciprocating mechanism relative to said standard including a reversible gearing mechanism carried on the upper end of the latter and operatively connected to said driving element.

24. A drilling mechanism comprising a wheeled support having a power driving element thereon, a vertically disposed standard mounted on said support, drill bit actuating mechanism slidably guided on said standard, and means for feeding said actuating mechanism relative to said standard comprising a gear rotatable about an axis substantially parallel with the longitudinal axis of said standard, and a plurality of gears continuously meshing therewith, the upper end of said feeding means being operatively connected to said driving element.

25. A drilling mechanism comprising a wheeled support having a power driving element thereon, a vertically disposed standard mounted on said support, drill bit actuating mechanism slidably guided on said standard, and means for feeding said actuating mechanism relative to said standard comprising a gear rotatable about an axis substantially parallel with the longitudinal axis of said standard, a plurality of gears continuously meshing therewith, and means for causing one or the other of said gears to drive said first mentioned gear, the upper end of said feeding means being operatively connected to said driving element.

26. A drilling mechanism comprising drill bit actuating mechanism, a driving motor therefor, and operative driving connections between said motor and said actuating mechanism comprising a plurality of coaxially disposed pulleys and cooperating gearing for operatively connecting said pulleys.

27. A drilling mechanism comprising drill bit actuating mechanism, a driving motor therefor, and operative driving connections between said motor and said actuating mechanism comprising a plurality of coaxially disposed rotatable elements, a common driving element for said rotatable elements, and differential gearing connecting said rotatable elements.

28. A drilling mechanism comprising a guiding frame, a frame slidably guided thereon, drill bit actuating mechanism carried by said sliding frame, a driving motor for said actuating mechanism, means for moving said sliding frame relative to said guiding frame, and operative driving connections between said motor and actuating mechanism including differential gearing, said gearing having a differential action only when said sliding frame is moved relative to said guiding frame.

29. A drilling mechanism comprising drill bit actuating mechanism, means for positively feeding said mechanism toward the work, and means for driving said mechanism including differential gearing, said gearing having a differential action only when said mechanism is fed.

30. A drilling mechanism comprising a guiding frame including a plurality of standards equally spaced from one another, a frame slidably guided thereon centrally between said standards comprising spaced upper and lower heads each presenting bearing surfaces engaging said standards, and a plurality of spacing members for said heads, relatively movable cylinder and piston elements carried by said sliding frame, means for slidably supporting said cylinder on said spacing members, a crank shaft carried by one of said heads, a rod connecting said shaft and cylinder, and means carried by the other head for slidably supporting said piston.

31. A drilling mechanism comprising a guiding frame including a plurality of standards equally spaced from one another, a frame slidably guided thereon centrally between said standards comprising a plurality of heads each presenting bearing surfaces engaging said standards and a plurality of means for holding said heads in fixed spaced relation, relatively movable cylinder and piston elements carried by said sliding frame, and means for slidably supporting one of said elements on said holding means including bearing supporting brackets carried by said latter element and disposed between adjacent sides of certain of said holding means.

32. A drilling mechanism comprising a vertically disposed standard, an element associated therewith, means for controlling said element comprising a gear rotatable about an axis substantially parallel to the longitudinal axis of the standard, a plurality of gears continuously meshing therewith, and means for causing one or the other of said gears to drive said first mentioned gear.

33. A drilling mechanism comprising drill bit actuating mechanism, a driving motor therefor, and means for feeding said actuating mechanism toward and from the work independently of said motor including a manually operable member rotatable to effect feeding and means for automatically disconnecting said member from said feeding means when said member is released by the operator.

34. A drilling mechanism comprising drill bit actuating mechanism, and means for feeding said actuating mechanism toward or from the work including a ratchet and pawl device having a rotatable operating member adapted to be manually actuated to effect feeding, and means for automatically disconnecting said operating member from said ratchet device when said operating member is released by the operator.

35. A drilling mechanism comprising drill bit actuating mechanism, and means for feeding said mechanism toward or from the work including a ratchet and pawl device, operating means therefor including rotatable means adapted to be manually actuated to effect feeding, and means for automatically disconnecting said pawl from said ratchet when said rotatable means is released by the operator.

36. A drilling mechanism comprising drill bit actuating mechanism, means for feeding said actuating mechanism toward or from the work including a ratchet and a cooperating pawl, and a manually operable member by which said pawl is carried, and means for automatically causing said pawl to engage said ratchet only when said member is manually actuated to effect feeding.

37. A drilling mechanism comprising drill bit actuating mechanism, means for feeding said actuating mechanism toward or from the work including a ratchet and a cooperating pawl, and a manually operable member by which said pawl is carried, and means including a friction device for automatically causing said pawl to engage said ratchet only when said member is manually actuated to effect feeding.

38. A drilling mechanism comprising drill bit actuating mechanism, means for feeding said actuating mechanism toward or from the work including a ratchet and a cooperating pawl, and a manually operable member by which said pawl is carried, means for automatically causing said pawl to engage said ratchet when said member is manually actuated to effect feeding, and means for automatically disengaging said pawl from said ratchet when said operating member is released by the operator.

39. A drilling mechanism comprising a tool, feeding means therefor, and manual means for controlling said feeding means comprising cooperating members adapted automatically to have a neutral relative position when released by the operator or an operative relation when one of said members is moved in either direction from said neutral position to effect feeding.

40. A drilling mechanism comprising a tool, feeding means therefor, and manual control means for said feeding means comprising a normally stationary member and a member adapted to be rotated, said first mentioned member being automatically positively connected with said other member only upon positive rotation thereof to effect feeding.

41. A drilling mechanism comprising a tool, feeding means therefor, manual control means for said feeding means comprising a normally stationary member and a member adapted to be rotated, said first mentioned member being positively connected with said other member only upon positive rotation thereof to effect feeding, and means for automatically disconnecting said members when said rotation has stopped.

42. A drilling mechanism comprising a supporting frame having a power driving element thereon, a guiding frame mounted on said supporting frame, a frame slidably guided thereon, drill bit actuating mechanism carried by said sliding frame, and means for effecting operation of said actuating mechanism including coaxially arranged independently rotatable pulleys carried by said sliding frame one of which is operatively connected to said actuating mechanism, a flexible endless driving connection between said pulleys and said driving element, and means for guiding said driving connection so disposed that said drill bit actuating mechanism may be raised or lowered in said guiding frame without changing the tension of said flexible connection.

43. A drilling mechanism comprising a supporting frame having a power driving element thereon, a guiding frame mounted on said supporting frame, a frame slidably guided thereon, drill bit actuating mechanism carried by said sliding frame, and means for effecting operation of said actuating mechanism including coaxially arranged pulleys carried by said sliding frame one of which is operatively connected to said actuating mechanism, a flexible endless driving connection between said pulleys and said driving element, and means for guiding said driving connection including coaxially arranged pulleys carried by said supporting frame so disposed that said drill bit actuating mechanism may be raised or lowered in said guiding frame without changing the tension of said flexible connection.

44. A drilling mechanism comprising a supporting frame having a power driving element thereon, a guiding frame mounted on said supporting frame, a frame slidably guided thereon, drill bit actuating mechanism carried by said sliding frame, and means for effecting operation of said actuating mechanism including coaxially arranged pulleys carried on said sliding frame one of which is operatively connected to said actuating mechanism, a flexible endless driving connection between said pulleys and said driving element, and means for guiding said driving connection including sets of coaxially arranged pulleys carried by said guiding frame and said supporting frame respectively and so disposed that the drill bit actuating mechanism may be raised or lowered in said guiding frame without changing the tension of said flexible connection.

45. A drilling mechanism comprising a supporting frame having a power driving element thereon, a guiding frame mounted on said supporting frame, a frame slidably guided therein, drill bit actuating mechanism carried by said sliding frame, and means for effecting operation of said actuating mechanism including coaxially arranged pulleys carried by said guiding frame, differential gearing operatively connecting said pulleys, and operative driving connections between said differential gearing and said driving element.

46. A drilling mechanism comprising a supporting frame having a power driving element thereon, a guiding frame mounted on said supporting frame, a frame slidably guided therein, drill bit actuating mechanism carried by said sliding frame, and means for effecting operation of said actuating mechanism including coaxially arranged pulleys carried by said guiding frame, differential gearing operatively connecting said pulleys, means operatively connecting said differential gearing with said driving element, coaxially arranged pulleys carried by said sliding frame, and operative driving connections between said first mentioned pulleys and said last mentioned pulleys.

47. A drilling mechanism comprising a supporting frame having a power driving element thereon, a guiding frame mounted on said supporting frame, a frame slidably guided in said guiding frame, drill bit actuating mechanism carried by said sliding frame, means for driving said actuating mechanism including a flexible driving member operatively connected to said driving element, and means for guiding said flexible driving member including coaxially arranged pulleys so disposed that the sliding frame may be moved relative to said guiding frame without variation in the effectiveness of said flexible driving member.

48. A drilling mechanism comprising a supporting frame having a power driving element thereon, a guiding frame mounted on said supporting frame, a frame slidably guided in said guiding frame, drill bit actuating mechanism carried by said sliding frame, means for moving said sliding frame relative to said guiding frame, and means for driving said actuating mechanism including a pulley carried by said guiding frame and operatively connected to said power driving element, coaxially arranged pulleys driven by said pulley, a pulley carried by said sliding frame and operatively connected to said actuating mechanism, a flexible connection operatively connecting said coaxially arranged pulleys with said last mentioned pulley, and means for guiding said flexible connection so disposed that the sliding frame may be moved relative to said guiding frame without changing the tension of said flexible connection.

49. A drilling mechanism comprising a supporting frame having a power driving element thereon, a guiding frame mounted on said supporting frame, a frame slidably guided in said guiding frame, drill bit actuating mechanism carried by said sliding frame, means for moving said sliding frame relative to said guiding frame, and means for driving said actuating mechanism including a pulley carried by the guiding frame and operatively connected to said driving element, coaxially arranged pulleys carried by said guiding frame, differential gearing driven by said first mentioned pulley and operatively connected to said coaxially arranged pulleys, a pulley carried by said sliding frame and operatively connected to said actuating mechanism, a flexible connection operatively connecting said coaxially arranged pulleys with said last mentioned pulley, and means for guiding said flexible connection so disposed that the sliding frame may be moved relative to said guiding frame without changing the tension of said flexible connection.

50. A drilling mechanism comprising a supporting frame having a power driving element thereon, a guiding frame mounted on said supporting frame, a frame slidably guided in said guiding frame, drill bit actuating mechanism carried by said sliding frame, means for moving said sliding frame relative to said guiding frame, and means for driving said actuating mechanism including a pulley carried by the guiding frame and operatively connected to said driving element, coaxially arranged pulleys carried by said guiding frame, differential gearing driven by said first mentioned pulley and operatively connected to said coaxially arranged pulleys, a pulley carried by said sliding frame and operatively connected to said actuating mechanism, a flexible connection operatively connecting said coaxially arranged pulleys with said last mentioned pulley, and means for guiding said flexible connection so disposed that the sliding frame may be moved relative to said guiding frame without changing the tension of said flexible connection, said first mentioned coaxially arranged pulleys having relative movement during movement of said sliding frame.

51. A drilling mechanism comprising a supporting frame having a power driving element thereon, a guiding frame mounted on said supporting frame, a frame slidably mounted in said guiding frame, drill bit actuating mechanism carried by said sliding frame, means for moving said sliding frame relative to said guiding frame, and means for effecting operation of said actuating mechanism operatively connected to said driving element including coaxially arranged pulleys rotatable on relatively fixed axes, coaxially arranged pulleys carried by said sliding frame, and a flexible driving connection connecting said pulleys, said flexible connection being operative to drive said actuating mechanism irrespective of the position of said sliding frame relative to said guiding frame.

52. A drilling mechanism comprising a standard, an element carried thereby and means for controlling said element including a shaft disposed transversely of said standard at the upper end thereof, a clutch mechanism associated with said shaft, and clutch controlling mechanism including a member extending through said shaft and terminating at one end thereof.

53. A drilling mechanism comprising a guiding frame, a frame slidably guided thereon comprising spaced upper and lower heads and rods for spacing said heads, and a plurality of relatively movable drill actuating members reciprocable between said heads, one of said members being guided by said rods.

54. A drilling mechanism comprising a guiding frame, a frame slidably guided thereon comprising spaced upper and lower heads and rods for spacing said heads, a plurality of relatively movable drill actuating members reciprocable between said heads, one of said members being guided by said rods, and means for supporting the opposite ends of said members in said heads while the other adjaceint ends thereof support each other.

55. A drilling mechanism comprising a guiding frame, a frame slidably guided thereon comprising spaced upper and lower heads, rods connecting said heads, and elements surrounding said rods for spacing said heads, and a plurality of relatively movable drill actuating members reciprocable between said heads, one of said members being guided by said spacing elements.

56. A drilling mechanism comprising a guiding frame, a frame slidably guided thereon comprising spaced upper and lower heads and rods for spacing said heads, and drill bit actuating means carried by said sliding frame comprising relatively reciprocable cylinder and piston fluid pressure generating elements, one of said elements being guided by said rods.

57. A drilling mechanism comprising a guiding frame, a frame slidably guided thereon comprising spaced upper and lower heads and rods for spacing said heads, drill bit actuating means carried by said sliding frame and comprising relatively movable cylinder and piston fluid pressure generating elements reciprocable between said heads, one of said elements being guided by said rods, and means for reciprocating said elements including means carried by said upper head.

58. A drilling mechanism comprising a guiding frame, a frame slidably guided thereon comprising spaced upper and lower heads and rods for spacing said heads, drill bit actuating means carried by said sliding frame and comprising relatively movable cylinder and piston fluid pressure generating elements reciprocable between said heads, one of said elements being guided by said rods, means for reciprocating said elements including means carried by said upper head, and a connecting rod operatively connected to said cylinder element.

59. A drilling mechanism comprising a guiding frame, a frame slidably guided thereon comprising spaced upper and lower heads and rods for spacing said heads, drill bit actuating means carried by said sliding frame comprising relatively movable cylinder and piston fluid pressure generating elements reciprocable between said heads, and crosshead members carried by said cylinder element and having curved guiding surfaces cooperating with said rods.

60. A drilling mechanism comprising a guiding frame, a frame slidably guided thereon comprising spaced upper and lower heads and rods for spacing said heads, drill rod actuating means carried by said sliding frame including a plurality of relatively movable members reciprocable between said heads, one of said members being guided by said rods, and drill rod guiding means carried by said lower head.

61. A drilling mechanism comprising a guiding frame, a frame slidably guided thereon comprising spaced upper and lower heads and parallel rods disposed at opposite sides of said sliding frame for spacing said heads, a plurality of relatively movable members reciprocable between said heads, and crosshead elements carried at the opposite sides of one of said members and engaging said rods for guiding said latter member.

62. A drilling mechanism comprising a guiding frame, a frame slidably guided thereon comprising spaced upper and lower heads and rods for spacing said heads, drill bit actuating means carried by said sliding frame comprising relatively movable cylinder and piston elements reciprocable between said heads, one of said elements being guided by said rods, means for reciprocating said elements including a crank shaft journaled in said upper head and a connecting rod connecting said crank shaft with said cylinder element, and drill rod guiding means carried by said lower head.

63. A drilling mechanism comprising a reciprocable drill actuating member, means for slidably supporting the same including a hollow member, a semi-cylindrical bearing carried by said reciprocable member to slidably engage the same, and tensioning means disposed within said hollow member to hold the same in position.

64. A drilling mechanism comprising a reciprocable drill actuating member, means for slidably supporting the same including a hollow member, a semi-cylindrical bearing carried by said reciprocable member to slidably engage the same, tensioning means disposed within said hollow member to hold the same in position, and bushings for retaining said hollow member in a predetermined radial relation to said tensioning means.

65. A mechanism comprising a guiding frame, a sliding frame guided thereon having a plurality of spaced heads, a plurality of pairs of spacing members, tensioning means for holding said heads and spacing members in operative relation, relatively movable cylinder and piston fluid pressure generating elements, and means for slidably supporting one of said elements on said spacing means including a pair of bearing supports disposed between each of said pairs of spacing members.

66. A mechanism comprising a guiding frame, a sliding frame guided thereon having a plurality of spaced heads, a plurality of pairs of spacing members, tensioning means for holding said heads and spacing members in operative relation, relatively movable cylinder and piston fluid pressure generating elements, means for slidably supporting one of said elements on said spacing means including a pair of bearing supports disposed between each of said pairs of spacing members, and means whereby rotation of said spacing members presents new bearing surfaces.

67. A mechanism comprising a guiding frame, a sliding frame guided thereon having a plurality of spaced heads, a plurality of spacing and tensioning means for said heads, relatively reciprocable piston and cylinder fluid pressure generating elements, and means for slidably supporting one of the same including bearings carried thereby adapted to be operatively supported by said first mentioned means.

68. A drilling mechanism comprising a guiding frame, a frame slidably guided thereon having a plurality of spaced heads, relatively reciprocable piston and cylinder elements for pneumatically actuating the drilling tool, and means for reciprocating one of said elements including a crank shaft carried by one of said heads and having a single connecting rod bearing, a rod connecting said shaft and one of said elements, said latter connection including a plurality of spaced bearings carried by the other end of said rod.

69. A mechanism comprising relatively movable cylinder and piston elements, means for actuating said cylinder element comprising a member having a bearing, a lubricant recess disposed below said bearing to catch lubricant therefrom, and laterally extending means allowing communication between said recess and said cylinder.

70. A mechanism comprising relatively reciprocable cylinder and piston elements, means for actuating said cylinder element including a member, an actuating rod connected to said member, a lubricant recess disposed adjacent said connection, a fluid passage leading to said cylinder, and laterally extending means allowing communication between said recess and said fluid passage.

71. A mechanism comprising relatively reciprocable cylinder and piston fluid pressure generating elements, means for actuating one of the same including a member, an actuating rod connected to said member, a lubricant recess disposed adjacent said connection, a fluid passage leading to said cylinder, laterally extending means allowing communication between said recess and said fluid passage, and means whereby lubricant is carried to said cylinder only during flow of fluid thereto.

72. A mechanism comprising relatively reciprocable piston and cylinder elements, means for actuating one of the same including a member, a bearing rod and a hollow wrist pin associated with said member, said hollow wrist pin comprising a lubricant reservoir, and means for lubricating said bearing from said reservoir.

73. A drilling mechanism comprising a reciprocable element, a central boss carried thereby, manually adjustable means cooperating with said boss for controlling fluid flow through said element, bearings disposed on each side of said boss, and actuating means operatively connected to said bearings outside the opposite sides of said boss, whereby free access to said adjustable means is provided.

74. A drilling mechanism comprising a portable self-propelled base having a motor thereon, a hollow standard carried by said base, tool carrying means slidably supported thereby, a tool carried thereby and means disposed within said hollow standard and driven by said motor for feeding said tool.

75. In a drilling mechanism, a portable self-propelled base having a motor thereon, a hollow standard on said base, a tool associated therewith, and means driven by said motor disposed within said standard and driven by said motor for feeding said tool.

76. A drilling mechanism comprising a portable self-propelled base having a motor thereon, a standard on said base, a tool associated therewith, means driven by said motor for feeding said tool including an enclosed member, and a member associated with said tool extending within said enclosure to cooperate with said enclosed member.

77. A drilling mechanism comprising a portable self-propelled base having a motor thereon, a hollow standard on said base, a tool associated therewith, and means driven by said motor for feeding said tool including rotatable means disposed within said hollow standard.

78. A drilling mechanism comprising a portable self-propelled base having a motor thereon, a hollow standard on said base, a tool associated therewith and slidably supported thereby, and means driven by said motor for feeding said tool including means rotatably supported within said hollow standard.

79. A drilling mechanism comprising a portable self-propelled base having a motor thereon, a hollow standard on said base, a tool associated therewith, and means driven by said motor for feeding said tool including a screw disposed within said standard.

80. A drilling mechanism comprising a portable base having a motor thereon, a hollow slotted standard on said base, a tool, supporting means therefor associated with said standard, and means driven by said motor for feeding said tool relative to said standard including a member disposed within said hollow standard, and an arm carried by said tool supporting means projecting through said slot and operatively connected to said member.

81. A drilling mechanism comprising a support having a power driving element thereon, a hollow standard mounted on said support, a movable drill carrying frame guided thereon, mechanism carried by said movable frame and operatively connected to said power driving element for actuating the drill, and means for feeding said frame longitudinally relative to said standard including means disposed within the latter and operatively connected at the upper end thereof to said driving element.

82. A drilling mechanism comprising a wheeled support having a power driving element thereon, a vertical standard carried by said support, a slidable frame guided on said standard, drill bit actuating mechanism carried by said frame and operatively connected to said power driving element, and means for feeding said drill bit actuating mechanism relative to said standard including a rotatable shaft disposed longitudinally of said standard and operatively connected to said driving element.

83. A drilling mechanism comprising a wheeled support having a power driving element thereon, a vertical guiding frame carried by said support, a frame slidably guided in said guiding frame, drill bit actuating mechanism carried by said sliding frame and operatively connected to said power driving element, and feeding means for raising and lowering said sliding frame longitudinally relative to said guiding frame comprising a transmission shaft extending longitudinally of the latter, and including means operatively connecting the upper end of said shaft to said driving element.

84. A drilling mechanism comprising a wheeled support having a power driving element thereon, a vertical guiding frame carried by said support, a frame slidably guided in said guiding frame, drill bit actuating mechanism carried by said sliding frame and operatively connected to said power driving element, and feeding means for raising and lowering said sliding frame longitudinally relative to said guiding frame comprising a feed screw disposed longitudinally of said guiding frame, and a cooperating nut carried by said sliding frame, said feeding means including means operatively connecting the upper end of said feed screw to said driving element.

85. A drilling mechanism comprising a plurality of guiding standards, a frame slidably guided thereon and having spaced upper and lower heads each presenting bearing surfaces engaging said standards, and means for holding said heads in spaced relation, drill bit actuating means carried by said sliding frame, and means for feeding said sliding frame relative to said guiding frame including nut carrying means disposed between said heads and supported by said holding means, feed nuts carried by said nut carrying means, and feed screws cooperating with said nuts and disposed within said standards.

86. A drilling mechanism comprising a plurality of guiding standards, a frame slidably guided thereon and having spaced upper and lower heads, and each presenting bearing surfaces engaging said standards, and means for holding said heads in spaced relation, and means for feeding said sliding frame relative to said standards including a feed nut carrying member held in position in engagement with one of said heads by said holding means and a feed screw cooperating with said feed nut and disposed centrally within one of said standards.

87. A drilling mechanism comprising a portable support having a power driving element thereon, a guiding standard carried by said support, a sliding frame guided on said standard, drill bit reciprocating and rotating mechanism carried by said sliding frame and including a driving pulley, mechanism operatively connected to said power driving element for feeding said sliding frame relative to said standard including coaxially arranged pulleys carried on top of the standard, a belt connection between said power driving element and one of said pulleys, and a belt connection between said other coaxial pulleys and said drill bit reciprocating and rotating driving pulley.

88. A drilling mechanism comprising a portable support having a power driving element thereon, a standard on said support, a frame slidably guided on said standard, drill bit actuating mechanism carried by said sliding frame, and driving connections between said drill bit actuating mechanism and said power driving element including coaxial pulleys carried by the top of said standard, coaxial pulleys carried at the bottom of said standard, coaxial pulleys carried by said sliding frame, and an endless belt connection engaging said pulleys.

89. A drilling mechanism comprising a portable support having a power driving element thereon, a standard on said support, a frame slidably guided on said standard, drill bit actuating mechanism carried by said sliding frame, and driving connections between said drill bit actuating mechanism and said power driving element including a set of coaxial pulleys carried by the top of said standard, a set of coaxial pulleys carried at the bottom of said standard, a set of coaxial pulleys carried by said sliding frame, an endless belt connection engaging said pulleys, and a differential connecting the coaxial pulleys of one set for permitting relative movement therebetween.

90. A drilling mechanism comprising a portable support having a power driving element thereon, a standard carried by said support, a sliding frame guided by said standard, drill bit actuating mechanism carried by said sliding frame, mechanism for feeding said sliding frame relative to said standard, driving connections between said power driving element and said feeding mechanism including a horizontal shaft carried at the top of said standard, reversely rotatable bevel pinions carried on said shaft, a clutch for alternatively connecting said pinions to said shaft, a bevel gear with which said pinions mesh, a spur gear coaxial with said bevel gear, spur pinions meshing with said spur gear, said feeding mechanism including feed screws respectively driven by said spur pinions, and operative driving connections between said horizontal shaft and said drill bit actuating mechanism.

In testimony whereof I affix my signature.

HENRY H. MERCER.

CERTIFICATE OF CORRECTION.

Patent No. 1,668,861.  Granted May 8, 1928, to

HENRY H. MERCER.

It is hereby certified that error appears in the printed specification of the above numbered patent requiring correction as follows: Page 5, line 126, claim 1, for the word "driven" read "driving"; and line 130, for the word "driven" second occurrence read "driving"; page 11, line 54, claim 54, for the misspelled word "adjaceint" read "adjacent"; page 13, lines, 11 and 12, claim 75, strike out the words "driven by said motor"; and that the said Letters Patent should be read with these corrections therein that the same may conform to the record of the case in the Patent Office.

Signed and sealed this 26th day of June, A. D. 1928.

M. J. Moore,
Acting Commissioner of Patents.

(Seal)